(12) United States Patent
Imada et al.

(10) Patent No.: US 9,695,314 B2
(45) Date of Patent: Jul. 4, 2017

(54) RESIN COMPOSITION AND RESIN MOLDED ARTICLE

(71) Applicant: FUJI XEROX CO., LTD., Tokyo (JP)

(72) Inventors: Akira Imada, Kanagawa (JP); Yuto Hanioka, Kanagawa (JP); Yuji Araki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 68 days.

(21) Appl. No.: 14/605,364

(22) Filed: Jan. 26, 2015

(65) Prior Publication Data

US 2016/0060456 A1 Mar. 3, 2016

(30) Foreign Application Priority Data

Sep. 2, 2014 (JP) ................... 2014-178115

(51) Int. Cl.
C08L 69/00 (2006.01)
C08L 23/08 (2006.01)
C08L 27/18 (2006.01)
C08L 53/00 (2006.01)
C08L 67/02 (2006.01)

(52) U.S. Cl.
CPC ..................... C08L 69/00 (2013.01)

(58) Field of Classification Search
None
See application file for complete search history.

(56) References Cited

U.S. PATENT DOCUMENTS

2003/0191243 A1* 10/2003 Hamada ............ C08F 297/026
525/94
2013/0237644 A1 9/2013 Xin et al.
2014/0296383 A1 10/2014 Xin et al.

FOREIGN PATENT DOCUMENTS

JP  EP 0992542 A1 * 4/2000 ............. C08L 69/00
JP  2013-147651 A    8/2013

OTHER PUBLICATIONS

Oertel et al, "Acrylic TPE approaching automotive", TPE Magazine, Jan. 2010.*
Daikin Fluorochemical Products Brochure, Mar. 2012.*
Polyflon MPA Addtives, Daikin Industries, May 30, 2016.*

* cited by examiner

Primary Examiner — Christopher M Rodd
(74) Attorney, Agent, or Firm — Oliff PLC

(57) ABSTRACT

A resin composition contains an aromatic polycarbonate resin, an aromatic polyester resin, an acrylic triblock copolymer composed of a polymer block containing an acrylic acid ester unit and a polymer block containing a methacrylic acid ester unit, a glycidyl group-containing polyethylene copolymer, an organic phosphorus flame retardant, and a flame retardant antidrip agent.

10 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-178115 filed Sep. 2, 2014.

BACKGROUND

1. Technical Field

The invention relates to a resin composition and a resin molded article.

2. Related Art

In the related art, various resin compositions are provided to be used in various ways. For example, the resin compositions are used in resin molded articles such as various housings and components of home appliances or automobiles, or used in resin molded articles such as housings of business machines and electric and electronic apparatuses.

An aromatic polycarbonate resin is a thermoplastic resin having excellent impact resistance, heat resistance, and the like, and is widely used as a resin molded article such as a housing and a component in the field of machines, automobiles, electric and electronic equipment, and the like. Furthermore, an aromatic polyester resin such as a polyethylene terephthalate resin is a resin indicating good molding fluidity.

Recently, a resin molded article obtainable from the resin composition has been required to be thin, and the improvement of the impact resistance and the flame retardance of the resin molded article obtainable from the resin composition containing the aromatic polycarbonate resin and the aromatic polyester resin is required.

SUMMARY

According to an aspect of the invention, there is provided a resin composition containing:
an aromatic polycarbonate resin;
an aromatic polyester resin;
an acrylic triblock copolymer composed of a polymer block containing an acrylic acid ester unit and a polymer block containing a methacrylic acid ester unit;
a glycidyl group-containing polyethylene copolymer;
an organic phosphorus flame retardant; and
a flame retardant antidrip agent.

DETAILED DESCRIPTION

Exemplary embodiment of the invention is described as follows. The exemplary embodiment is an example for realizing the invention, and the invention is not limited to the exemplary embodiment.

Resin Composition

A resin composition according to the exemplary embodiment is a resin composition containing an aromatic polycarbonate resin, an aromatic polyester resin, an acrylic triblock copolymer composed of a polymer block containing an acrylic acid ester unit and a polymer block containing a methacrylic acid ester unit, a glycidyl group-containing polyethylene copolymer, an organic phosphorus flame retardant, and a flame retardant antidrip agent.

Also, the resin composition according to the exemplary embodiment may improve impact resistance and flame retardance of an obtainable resin molded article, compared with a resin composition composed of an aromatic polycarbonate resin, an aromatic polyester resin, an organic phosphorus flame retardant, and a flame retardant antidrip agent. Though this mechanism is unclear, the following reasons may be possibly considered.

It is considered that a terminal group of the aromatic polycarbonate resin or the aromatic polyester resin reacts with a glycidyl group of a glycidyl group-containing polyethylene copolymer contained in the resin composition according to the exemplary embodiment to cause the aromatic polycarbonate resin or the aromatic polyester resin to have a high molecular weight. The resulting polycarbonate resin or aromatic polyester resin having a high molecular weight is compatible with an acrylic triblock copolymer composed of a polymer block containing an acrylic acid ester unit and a polymer block containing a methacrylic acid ester unit (hereinafter, simply referred to as an "acrylic triblock copolymer") contained in the resin composition according to the exemplary embodiment and therefore, the dispersibility of the polycarbonate resin or the aromatic polyester resin having a high molecular weight is improved. That is, it is considered that the polycarbonate resin or the aromatic polyester resin having a high molecular weight is dispersed in the resin composition, and the uneven distribution of the resins is prevented to contribute to the enhancement of the impact resistance of the obtainable resin molded article. In addition, it is considered that the polyethylene copolymer and the acrylic triblock copolymer function as an elastomer having a rubber elastic member by cooling, to contribute to the enhancement of the impact resistance of the obtainable resin molded article. Further, since the melt viscosity during kneading the resin decreases by the presence of the polyethylene copolymer and the acrylic triblock copolymer, the dispersibility of the organic phosphorus flame retardant and the flame retardant antidrip agent is enhanced to contribute to the enhancement of the flame retardance of the obtainable resin molded article.

In addition, since the dispersibility and the fluidity of the resin is enhanced by the glycidyl group-containing polyethylene copolymer and the acrylic triblock copolymer, it is considered that the resin composition according to the exemplary embodiment of the invention has enhanced molding fluidity at the time of the injection molding, compared with the resin composition formed of the aromatic polycarbonate resin, the aromatic polyester resin, the organic phosphorus flame retardant, and the flame retardant antidrip agent.

Hereinafter, respective components constituting the resin composition according to the exemplary embodiment of the invention are described.

Aromatic Polycarbonate Resin

The aromatic polycarbonate resin is not particularly limited as long as the aromatic polycarbonate resin is a polycarbonate resin having an aromatic group. Examples thereof include bisphenol A-type, Z-type, S-type, MIBK-type, AP-type, TP-type, biphenyl-type, and bisphenol A hydrogen added-type polycarbonates.

For example, the aromatic polycarbonate resin is manufactured by the reaction of dihydric phenol and carbonate precursor.

Examples of the dihydric phenol include 2,2-bis(4-hydroxyphenyl)propane[bisphenol A], bis(4-hydroxyphenyl) methane, 1,1-bis(4-hydroxyphenyl)ethane, 2,2-bis(4-hydroxy-3,5-dimethylphenyl)propane, bis(4-hydroxyphenyl) cycloalkane, bis(4-hydroxyphenyl)oxide, bis(4- hydroxyphenyl)sulfide, bis(4-hydroxyphenyl)sulfone, bis(4-hydroxyphenyl)sulfoxide, bis(4-hydroxyphenyl)ether and bis(4-hydroxyphenyl)ketone.

Examples of the carbonate precursor include carbonyl halide, carbonyl ester, and haloformate, and more specifically, include phosgene, dihaloformate of dihydric phenol, diphenyl carbonate, dimethylcarbonate, and diethyl carbonate.

For example, a weight average molecular weight (Mw) of the aromatic polycarbonate resin is preferably from 10,000 to 100,000, and more preferably from 15,000 to 50,000. In addition, for example, a number average molecular weight (Mn) of the aromatic polycarbonate resin is preferably from 5,000 to 50,000, and more preferably from 10,000 to 30,000. If the weight average molecular weight of the aromatic polycarbonate is less than 10,000 and the number average molecular weight is less than 5,000, the fluidity of the resin composition may become surplus, and the workability of the resin molded article may decrease. If the weight average molecular weight of the polycarbonate resin exceeds 100,000 and the number average molecular weight exceeds 50,000, the fluidity of the resin composition may decrease and the workability of the resin molded article may decrease.

The weight average molecular weight and the number average molecular weight are measured by gel permeation chromatography (GPC). The measurement of the molecular weight by GPC is performed by using GPC, HLC-8120 manufactured by Tosoh Corporation as a measuring apparatus, with a column, TSKgel Super HM-M (15 cm) manufactured by Tosoh Corporation, in a hexafluoroisopropanol solvent. The weight average molecular weight and the number average molecular weight are calculated by using a molecular weight calibration curve manufactured by a monodispersed polystyrene standard sample from the measurement results. In the following, the weight average molecular weight and the number average molecular weight are measured in the same manner.

The content of the aromatic polycarbonate resin according to the exemplary embodiment is preferably from 30% by weight to 90% by weight, and more preferably from 40% by weight to 80% by weight with respect to the total amount of the resin composition. If the content of the aromatic polycarbonate is less than 30% by weight or exceeds 90% by weight with respect to the total amount of the resin composition, the molding fluidity of the resin may decrease.

The aromatic polycarbonate resin according to the exemplary embodiment preferably includes a collected aromatic polycarbonate resin (hereinafter, also referred to as a recycled aromatic polycarbonate resin) which is collected from the market. Since hydrolysis proceeds in the recycled aromatic polycarbonate resin, compared with the aromatic polycarbonate resin before being released to the market, it is considered that many terminal groups that react with the glycidyl group-containing polyethylene copolymer exist. Therefore, it is considered that the aromatic polycarbonate resin is caused to have higher molecular weight, and the impact resistance is enhanced.

For example, the recycled aromatic polycarbonate resin is formed by collecting the resin molded article of the aromatic polycarbonate resin from the market, and crushing the collected resin molded articles with a crusher such as a dry-type or a wet-type crusher. For example, the content of the recycled aromatic polycarbonate resin is preferably in a range of 10% to 90%, and more preferably in a range of 20% to 80% of the aromatic polycarbonate resin included in the resin composition. If the content of the recycled aromatic polycarbonate resin is from 10% to 90%, the impact resistance of the resin molded article is enhanced, compared with the case in which the range is not satisfied.

Aromatic Polyester Resin

The aromatic polyester resin used in the exemplary embodiment is polyester having an aromatic ring in a chain unit of a polymer. Examples thereof include a polymer or a copolymer which is obtainable by polycondensation reactions of aromatic dicarboxylic acid and diol (and ester forming derivatives) as main components.

Examples of the aromatic dicarboxylic acid include phthalic acid, terephthalic acid, isophthalic acid, orthophthalic acid, 1,5-naphthalenedicarboxylic acid, biphenyl-2,2'-dicarboxylic acid, diphenylsulfon-4,4'-dicarboxylic acid, anthracene-2,5-dicarboxylic acid, p-terphenylene-4,4'-dicarboxylic acid, and pyridine-2,5-dicarboxylic acid.

Examples of the diol component include aliphatic glycol, polyoxyalkylene glycol, alicyclic diol, and aromatic diol. Examples of the aliphatic glycol include aliphatic glycol having 2 to 12 carbon atoms such as ethylene glycol and trimethylene glycol. Examples of the polyoxyalkylene glycol include glycol having plural oxyalkylene units with alkylene groups having 2 to 4 carbon atoms. For example, diethylene glycol and dipropylene glycol are included. Examples of the alicyclic diol include 1,4-cyclohexanediol and 1,4-cyclohexanedimethylol. Examples of the aromatic diol include 2,2-bis-(4-(2-hydroxyethoxy)phenyl)propane, and xyleneglycol.

Specifically, examples of the aromatic polyester resin used in the exemplary embodiment include polyethylene terephthalate (PET), polypropylene terephthalate, polybutylene terephthalate, polyethylene naphthalate, polybutylene naphthalate, polyethylene-1,2-bis(phenoxy)ethane-4,4'-dicarboxylate, polycyclohexylenedimethylene terephthalate. Among them, in view of the fluidity of the resin composition, polyethylene terephthalate (PET) is preferable.

For example, the weight average molecular weight of the aromatic polyester resin is from 5,000 to 100,000, and more preferably from 10,000 to 50,000. In addition, for example, the number average molecular weight of the aromatic polyester resin is preferably from 5,000 to 50,000, and more preferably from 10,000 to 40,000. If the weight average molecular weight of the aromatic polyester resin is less than 5,000 and the number average molecular weight is less than 5,000, the fluidity of the resin composition may increase and the workability may decrease, compared with the case in which the range is satisfied. In addition, if the weight average molecular weight of the aromatic polyester resin exceeds 100,000 and the number average molecular weight exceeds 50,000, the fluidity of the resin composition may decrease and the workability may decrease, compared with the case in which the range is satisfied.

The content of the aromatic polyester resin is preferably from 5% by weight to 50% by weight, and more preferably from 10% by weight to 45% by weight with respect to the total amount of the resin composition. If the content of the aromatic polyester resin is less than 5% by weight with respect to the total amount of the resin composition, the chemical resistance of the obtainable resin molded article may decrease, and if the content thereof exceeds 50% by weight, the heat resistance of the obtainable resin molded article may decrease, compared with the case in which the range is satisfied.

The aromatic polyester resin according to the exemplary embodiment preferably contains the collected polyethylene terephthalate resin (hereinafter, also referred to as a recycled PET resin) which is collected from the market. Since hydrolysis proceeds in the recycled PET resin, compared with the PET resin before being released to the market, it is considered that many terminal groups that react with the glycidyl group-containing polyethylene copolymer exist. Therefore, it is considered that the aromatic polyester resin is caused to have higher molecular weight to improve the impact resistance.

For example, the recycled PET resin is formed by collecting the resin molded article of the PET resin from the market, and crushing the collected resin molded articles with a crusher such as a dry-type or a wet-type crusher. For example, the content of the recycled PET resin is preferably in a range of 10% to 90%, and more preferably in a range of 20% to 80% of the aromatic polyester resin contained in the resin composition. If the content of the recycled PET resin is from 10% to 90%, it is considered that the impact resistance of the resin molded article is enhanced, compared with the case in which the range is not satisfied.

Acrylic Triblock Copolymer

The acrylic triblock copolymer is composed of the polymer block containing the acrylic acid ester unit and the polymer block containing the methacrylic acid ester unit.

Polymer Block Containing Acrylic Acid Ester Unit

Examples of the acrylic acid ester unit include constituent units derived from monomers such as methyl acrylate, ethyl acrylate, propyl acrylate, butyl acrylate, isobutyl acrylate, n-octyl acrylate, dodecyl acrylate, 2-ethylhexyl acrylate, stearyl acrylate, phenyl acrylate, and dimethylaminoethyl acrylate. The acrylic acid ester units may be used singly, or two or more kinds thereof may be used in combination.

For example, the polymer block containing the acrylic acid ester unit is obtainable by the polymerization reaction of the monomers. For example, the molecular weight of the polymer block containing the acrylic acid ester unit is preferably from 6,000 to 1,000,000, and more preferably from 10,000 to 800,000 as the weight average molecular weight. If the weight average molecular weight of the polymer block containing the acrylic acid ester unit is less than 6,000, the impact resistance may decrease, and if the weight average molecular weight exceeds 1,000,000, the fluidity of the acrylic triblock copolymer may decrease.

The polymer block containing the acrylic acid ester unit may contain other constituent units in addition to the acrylic acid ester unit. Examples of the other constituent units include other monomers such as glycidyl acrylate, allyl acrylate, methacrylic acid ester, methacrylic acid, acrylic acid, an aromatic vinyl compound, acrylonitrile, methacrylonitrile, and olefin.

The content of the polymer block containing the acrylic acid ester unit in the acrylic triblock copolymer is preferably from 30% by weight to 80% by weight, and more preferably from 40% by weight to 70% by weight. If the content of the polymer block containing the acrylic acid ester unit is within the range, the impact resistance and the flame retardance of the obtainable resin molded article are enhanced compared with the case in which the content is out of the range.

Polymer Block Containing Methacrylic Acid Ester Unit

Examples of the methacrylic acid ester unit include constituent units derived from monomers such as methyl (meth)acrylate, ethyl (meth)acrylate, propyl (meth)acrylate, butyl (meth)acrylate, hexyl (meth)acrylate, cyclohexyl (meth)acrylate, octyl (meth)acrylate, nonyl (meth)acrylate, octadecyl (meth)acrylate, dodecyl(meth)acrylate, and 2-ethylhexyl (meth)acrylate. The methacrylic acid ester units may be used singly, or two or more types thereof may be used in combination.

For example, the polymer block containing the methacrylic acid ester unit is obtainable by the polymerization reaction of the monomers. For example, the molecular weight of the polymer block containing the methacrylic acid ester unit is preferably from 1,000 to 1,000,000, and more preferably from 2,000 to 750,000 as the weight average molecular weight. If the weight average molecular weight of the polymer block containing the methacrylic acid ester unit is less than 1,000, the dispersibility in the matrix resin may decrease, if the weight average molecular weight exceeds 1,000,000, the fluidity of the acrylic block copolymer may decrease.

The polymer block containing the methacrylic acid ester unit may contain the other constituent units in addition to the methacrylic acid ester unit. Examples of the other constituent unit include other monomers such as acrylic acid ester, methacrylic acid, acrylic acid, an aromatic vinyl compound, acrylonitrile, methacrylonitrile, and olefin.

For example, the content of the polymer block of the methacrylic acid ester unit in the acrylic triblock copolymer is preferable from 20% by weight to 70% by weight, and more preferably from 30% by weight to 60% by weight. If the content of the polymer block containing the methacrylic acid ester unit is in the range, it is considered that the compatibility to the resin composition may increase, compared with the case in which the content is out of the range.

As long as the acrylic triblock copolymer according to the exemplary embodiment is a triblock copolymer composed of the polymer block containing the acrylic acid ester unit and the polymer block containing the methacrylic acid ester unit, any kinds of connection formation of the constituent blocks are possible. That is, if the polymer block containing the acrylic acid ester unit is set to be A, and the polymer block containing the methacrylic acid ester unit is set to be B, examples of the acrylic triblock copolymer include an ABA-type triblock copolymer, and a BAB-type triblock copolymer. Among them, in view of the impact resistance and the flame retardance, the triblock copolymer in which the polymer blocks containing the methacrylic acid ester units are coupled to both terminals of the polymer block containing the acrylic acid ester unit (BAB-type triblock copolymer) is preferable.

Specific examples of the acrylic triblock copolymer include triblock copolymer of a methyl methacrylate polymer (PMMA polymer) block and a n-butyl acrylate polymer (PnBA polymer) block. Specifically, a triblock copolymer in which methyl methacrylate polymer blocks are coupled to both terminals of the n-butyl acrylate polymer block is included.

The molecular weight of the acrylic triblock copolymer is preferably from 1,000 to 1,000,000, and more preferably from 2,000 to 500,000 as the weight average molecular weight. If the weight average molecular weight of the acrylic triblock copolymer is less than 1,000 or exceeds 1,000,000, the fluidity in the resin composition may decrease and the impact resistance and the tensile elongation at break may decrease, compared with the case in which the weight average molecular weight is within the range.

For example, the content of the acrylic triblock copolymer is preferably from 2.0% by weight to 10% by weight, and more preferably from 4% by weight to 8% by weight with respect to the 100 parts by weight of the aromatic polycarbonate resin and the aromatic polyester resin in total. If the content of the acrylic triblock copolymer is within the range, it is considered that it is possible to obtain the resin composition of which the impact resistance and the flame retardance of the obtainable resin molded article are enhanced, compared with the case in which the content is less than 2% by weight or exceeds 10% by weight.

Examples of the method of manufacturing the acrylic triblock copolymer include a method of living-polymerizing monomers that constitute respective blocks. Examples of the living polymerization method include an anionic polymerization method under the presence of mineral acid salt such as salt of alkali metal or alkali earth metal, by using an organic alkali metal compound as a polymerization initiator, an anionic polymerization method under the presence of an organic aluminum compound by using an organic alkali metal compound as a polymerization initiator, a polymerization method using an organic rare earth metal complex as a polymerization initiator, and a radical polymerization method under the presence of a copper compound by using an α-halogenized ester compound as an initiator. As the method of manufacturing a triblock copolymer in which the polymer blocks containing the methacrylic acid ester unit are coupled to both terminals of the polymer block containing the acrylic acid ester unit (BAB-type triblock copolymer), the radical polymerization method is preferable.

In addition, as the acrylic block copolymer, a commercial product may be used. Examples of the commercial product include "LA2140e (product name)" manufactured by Kuraray Co., Ltd., "LA2250 (product name)" manufactured by Kuraray Co., Ltd., "LA4285 (product name)" manufactured by Kuraray Co., Ltd., and "LA1114 (product name)" manufactured by Kuraray Co., Ltd.

Glycidyl Group-Containing Polyethylene Resin

The glycidyl group-containing polyethylene copolymer used in the exemplary embodiment is a copolymer containing an ethylene unit and a (meth)acrylic acid ester unit having a glycidyl group. Examples of the (meth)acrylic acid ester unit having the glycidyl group include constituent units derived from monomers such as glycidyl(meth)acrylate, vinyl glycidyl ether, (meth)acryl glycidyl ether, 2-methyl propenyl glycidyl ether, styrene-p-glycidyl ether, glycidyl cinnamate, itaconic acid glycidyl ester, and N-[4-(2,3-epoxypropoxy)-3,5-dimethylbenzyl]methacryl amide. Among them, since a polyethylene copolymer having a glass transition temperature of 0° C. or less may be obtained, glycidyl (meth)acrylate is preferable. In addition, "(meth)acryl" refers to acryl or methacryl.

It is preferable that the glycidyl group-containing polyethylene copolymer is a copolymer which is composed of an ethylene unit and a glycidyl group-containing (meth)acrylic acid ester unit, in which the content of the glycidyl group-containing (meth)acrylic acid ester unit in the glycidyl group-containing polyethylene copolymer is from 2% by weight to 20% by weight and which has a glass transition temperature of 0° C. or less, or a copolymer obtained by graft-polymerizing the polymerizable vinyl monomer onto a main chain of the polyethylene copolymer composed of the ethylene unit and the glycidyl group-containing (meth) acrylic acid ester unit. It is considered that the glycidyl group-containing polyethylene copolymer has improved impact resistance of the obtainable resin molded article, compared with the polyethylene copolymer which is composed of the ethylene unit and the glycidyl group-containing (meth)acrylic acid ester unit, and of which the content of the glycidyl group-containing (meth)acrylic acid ester unit in the glycidyl group-containing polyethylene copolymer is less than 2% by weight or exceeds 20% by weight. In addition, it is considered that, if the content of the glycidyl group-containing (meth)acrylic acid ester unit in the glycidyl group-containing polyethylene copolymer is less than 2% by weight, the aromatic polycarbonate resin and the aromatic polyester resin may not be caused to have high molecular weight, compared with the case in which the range is satisfied, and if the content exceeds 20% by weight, the fluidity of the resin composition decrease, compared with the case in which the range is satisfied. In addition, if the glass transition temperature exceeds 0° C., it is considered that the elasticity of the obtainable resin molded article decrease, compared with the case in which the glass transition temperature is 0° C. or less.

A glass transition temperature of the polyethylene copolymer refers to a glass transition temperature measured as follows. That is, a thermal spectrum is measured with a differential calorimeter (differential scanning calorimeter, DSC-60, manufactured by Shimadzu Corporation) under conditions of a rate of temperature increase of 10° C. per minute, and the intermediate value (Tgm) between two shoulder values obtained from a glass transition-derived peak by a tangent method is taken as the glass transition temperature.

Examples of the method of manufacturing the glycidyl group-containing polyethylene copolymer include a method of living-polymerizing monomers that constitute the ethylene unit and the glycidyl group-containing (meth)acrylic acid ester unit. Examples of the living polymerization include an anionic polymerization method under the presence of a mineral acid salt such as salt of alkali metal or alkali earth metal by using an organic alkali metal compound as a polymerization initiator, an anionic polymerization method under the presence of an organic aluminum compound by using an organic alkali metal compound as a polymerization initiator, a polymerization method using an organic rare earth metal complex as a polymerization initiator, and a radical polymerization method under the presence of a copper compound by using an α-halogenized ester compound as an initiator.

As a method of manufacturing a copolymer obtained by performing graft polymerization of the polymerizable vinyl monomer onto a main chain of the polyethylene copolymer, for example, a method of adding the polymerizable vinyl monomer to the polyethylene copolymer, and polymerizing the resultant in a single stage or multiple stages by radical polymerization.

Examples of the polymerizable vinyl monomer include an ester vinyl monomer unit, an aromatic vinyl monomer unit, and a vinyl cyanide monomer unit. Examples of the ester vinyl monomer unit include methyl (meth)acrylate, ethyl (meth)acrylate, butyl (meth)acrylate, isobutyl (meth)acrylate, and 2-ethylhexyl (meth)acrylate. Examples of the aromatic vinyl monomer include styrene and vinylnaphthalene. Examples of the vinyl cyanide monomer include acrylonitrile, α-chloroacrylonitrile, and methacrylonitrile.

For example, the weight average molecular weight of the glycidyl group-containing polyethylene copolymer is preferably from 3,000 to 100,000, and more preferably from 5,000 to 50,000. If the weight average molecular weight of the glycidyl group-containing polyethylene copolymer is less than 3,000, the impact resistance may decrease, compared with the case in which the range is satisfied, and if the weight average molecular weight of the glycidyl group-containing polyethylene copolymer exceeds 100,000, the dispersibility in the resin composition may decrease, compared with the case in which the range is satisfied.

The content of the glycidyl group-containing polyethylene copolymer is preferably from 1% by weight to 5% by weight, and more preferably from 2% by weight to 4% by weight with respect to the 100 parts by weight of the aromatic polycarbonate resin and the aromatic polyester resin in total. If the content of the glycidyl group-containing polyethylene copolymer is from 1% by weight to 5% by weight, it is considered that the impact resistance of the obtainable resin molded article is enhanced, compared with the case in which the content is less than 1% by weight or exceeds 15% by weight.

Organic Phosphorus Flame Retardant

Examples of the organic phosphorus flame retardant include aromatic phosphate ester, aromatic condensed phosphate ester, phosphinic acid salt, and polyphosphate having a triazine skeleton. As an organic phosphorus flame retardant, a synthetic product or a commercial product may be used. As commercial products of the organic phosphorus flame retardant, "CR-741" manufactured by Daihachi Chemical Industry Co., Ltd., "AP422" manufactured by Clariant, and "Nova Exceli 140" manufactured by Rin Kagaku Kogyo Co., Ltd. are included.

Flame Retardant Antidrip Agent

The flame retardant antidrip agent may be an agent that may prevent resin drip at the time of the burning of the resin molded article, and examples of the flame retardant antidrip agent include fluorine resins such as polytetrafluoroethylene, polyvinylidene fluoride, and polyhexafluoropropylene.

Other Components

The resin composition according to the exemplary embodiment may contain other components without deteriorating the impact resistance and the flame retardance of the obtainable resin molded article. Examples of the other components include a hydrolysis inhibitor, an antioxidant, and a filler.

Examples of the hydrolysis inhibitor include a carbodiimide compound, and an oxazoline compound. Examples of the carbodiimide compound include dicyclohexylcarbodiimide, diisopropylcarbodiimide, dimethylcarbodiimide, diisobutyl carbodiimide, dioctyl carbodiimide, diphenyl carbodiimide, and naphthylcarbodiimide.

Examples of the antioxidant include phenol-based, amine-based, phosphorus-based, sulfur-based, hydroquinone-based, and quinoline-based antioxidants.

Examples of the filler include clay such as kaolin clay, bentonite clay, kibushi clay, and gairome clay, talc, mica, and montmorillonite.

Resin Molded Article

The resin molded article according to the exemplary embodiment includes a resin composition according to the exemplary embodiment. For example, the aforementioned resin composition according to the exemplary embodiment is molded, for example, by a molding method such as injection molding, extrusion molding, blow molding, and hot press molding, to obtain the resin molded article according to the exemplary embodiment. According to the exemplary embodiment, in view of the dispersibility of the respective components in the resin molded article, the resin molded article is preferably obtained by injection-molding the resin composition according to the exemplary embodiment.

The injection molding may be conducted by using a commercially available apparatuses such as "NEX 150" and "NEX 70000" manufactured by Nissei Plastic Industrial Co., Ltd., and "SE50D" manufactured by Toshiba Machine Co., Ltd. At this point, in view of the compatibilization of a polylactic resin, a styrene resin, an aromatic polycarbonate resin, a cylinder temperature is preferably from 170° C. to 280° C. In addition, in view of productivity and the like, a mold temperature is preferably from 30° C. to 120° C.

The resin molded article according to the exemplary embodiment is appropriately used for electric and electronic apparatuses, home appliances, containers, automobile interior materials, and the like. More specifically, examples of the use include housings, various kinds of components, and the like of home appliances or electric and electronic apparatuses, wrapping films, storage cases such as for CD-ROM or DVD, tableware, food trays, bottles for beverages, and medicine wrapping materials, and among them, the resin molded article is appropriately used for electric and electronic apparatuses. Particularly, the components of the electric and electronic apparatuses require high impact resistance and flame retardance. Also, the resin molded article according to the exemplary embodiment which is obtainable from the resin composition containing an aromatic polycarbonate resin, an aromatic polyester resin, an acrylic triblock copolymer composed of a polymer block containing an acrylic acid ester unit and a polymer block containing a methacrylic acid ester unit, a glycidyl group-containing polyethylene copolymer, an organic phosphorus flame retardant, and a flame retardant antidrip agent has improved impact resistance and flame retardance, compared with the resin molded article obtainable from a resin composition formed of an aromatic polycarbonate resin, an aromatic polyester resin, an organic phosphorus flame retardant, and a flame retardant antidrip agent.

EXAMPLE

The invention is described in detail with reference to examples and comparative examples, but the invention is not limited thereto.

Aromatic Polycarbonate Resin

Aromatic polycarbonate resins (hereinafter, referred to as a PC resin) used in the examples and the comparative examples are as follows. A PC resin A-1 is "L1225LL" manufactured by TEIJIN Limited, a PC resin A-2 is "L1225L" manufactured by TEIJIN Limited, a PC resin A-3 is "IB2500" manufactured by Idemitsu Kosan Co., Ltd., a PC resin A-4 is a compact disk-derived recycled PC resin, a PC resin A-5 is a drink bottle-derived recycled PC resin, and a PC resin A-6 is a semiconductor case-derived recycled PC resin.

Aromatic Polyester Resin

Aromatic polyester resins used in the examples and the comparative examples are as follows. A PET resin B-1 is "J125" manufactured by Mitsui Chemicals, Inc., a PET resin B-2 is a recycled PET resin obtained by performing solid-state polymerization on PET flakes, and a PET resin B-3 is a recycled PET resin obtained by regranulating PET flakes.

Weight average molecular weights and number average molecular weights of the PC resins A-1 to A-6 and coefficients of viscosity (IV value) of the PET resins B-1 to B-3 are collectively presented in Table 1.

TABLE 1

| Aromatic polycarbonate resin | | Mw | Mn | Mw/Mn |
|---|---|---|---|---|
| PC resin A-1 | L1225LL (Tejin) | 28,800 | 12,400 | 2.32 |
| PC resin A-2 | L1225L (Tejin) | 39,000 | 15,900 | 2.45 |
| PC resin A-3 | IB2500 (Idemitsu) | 57,600 | 20,500 | 2.80 |
| PC resin A-4 | Compact disk-derived recycled PC resin | 28,400 | 11,900 | 2.40 |
| PC resin A-5 | Drink bottle-derived recycled PC resin | 53,300 | 17,400 | 3.07 |
| PC resin A-6 | Semiconductor case-derived recycled PC resin | 36,700 | 14,000 | 2.61 |

TABLE 1-continued

| | Aromatic polyester resin | IV value (dl/g) |
|---|---|---|
| PC resin B-1 | J125 (Mitsui Chemicals) | 0.77 |
| PC resin B-2 | Recycled PET resin obtained by performing solid-state polymerization on PET flakes | 0.78 |
| PC resin B-3 | Recycled PET resin obtained by regranulating PET flakes | 0.67 |

Acrylic Triblock Copolymer C-1

An acrylic block copolymer C-1 is "LA2250" manufactured by Kuraray Co., Ltd., which is a triblock copolymer of a polymethyl methacrylate (PMMA) block, a poly(n-butyl acrylate) (PnBA) block, and a PMMA block. A weight average molecular weight (Mw) of the acrylic block copolymer C-1 is 60,300, and a ratio of the respective polymer blocks is PMMA (16% by weight):PnBA (68% by weight):PMMA (16% by weight).

Acrylic Triblock Copolymer C-2

An acrylic block copolymer C-2 is "LA2140e" manufactured by Kuraray Co., Ltd. which is a triblock copolymer of a PMMA block, a PnBA block, and a PMMA block. A weight average molecular weight (Mw) of the acrylic block copolymer C-2 is 79,800, and a ratio of the respective polymer blocks is PMMA (12% by weight):PnBA (76% by weight):PMMA (12% by weight).

Acrylic Triblock Copolymer C-3

The acrylic block copolymer C-3 is a triblock copolymer of a PMMA block, a PnBA block, and a PMMA block. A weight average molecular weight (Mw) of the acrylic block copolymer C-3 is 40,300, and a ratio of the respective polymer block is PMMA (35% by weight):PnBA (30% by weight):PMMA (35% by weight).

Acrylic Triblock Copolymer C-4

An the acrylic block copolymer C-4 is a triblock copolymer of a PMMA block, a PnBA block, and a PMMA block. The weight average molecular weight (Mw) of the acrylic block copolymer C-4 is 36,100, and a ratio of the respective polymer block is PMMA (40% by weight):PnBA (20% by weight):PMMA (40% by weight).

Acrylic Triblock Copolymer C-5

An acrylic block copolymer C-5 is a triblock copolymer of a PMMA block, a PnBA block, and a PMMA block. A weight average molecular weight (Mw) of the acrylic block copolymer C-5 is 90,400, and a ratio of the respective polymer blocks is PMMA (5% by weight):PnBA (90% by weight):PMMA (5% by weight).

Acrylic Triblock Copolymer C-6

An acrylic block copolymer C-6 is a triblock copolymer of a PMMA block, a PnBA block, and a PMMA block. A weight average molecular weight (Mw) of the acrylic block copolymer C-6 is 80,600, a molecular weight distribution (Mw/Mn) is 1.12, and a ratio of the respective polymer blocks is PMMA (10% by weight):PnBA (80% by weight):PMMA (10% by weight).

Comparative Polymer C-7

A comparative polymer C-7 is a diblock copolymer of a PMMA block and a PnBA block. A weight average molecular weight (Mw) of the comparative polymer C-7 is 20,000, and a ratio of the respective polymer blocks is PMMA (50% by weight):PnBA (50% by weight).

Comparative Polymer C-8

A comparative polymer C-8 is "Metablen P-530A" manufactured by Mitsubishi Rayon Co., Ltd., which is a PMMA monopolymer. A weight average molecular weight (Mw) of the comparative polymer C-7 is 3,600,000.

Comparative Polymer C-9

A comparative polymer C-9 is a styrene block copolymer of "MA-001" manufactured by Kuraray Co., Ltd., and is a modified maleic anhydride of a triblock copolymer of a polystyrene polymer (PSt) block, an ethyl 3-ethoxypropionate polymer (EEP) block, and a PSt block. The weight average molecular weight (Mw) of the comparative polymer C-8 is 101,000, and the ratio of the respective polymer blocks is PSt (14.8% by weight):EEP (69.2% by weight):PSt (14.8% by weight).

Composition ratios (% by weight) and weight average molecular weights (Mw) of the acrylic triblock copolymers C-1 to C-6 and the comparative polymers C-7 to C-9 are collectively presented in Table 2.

TABLE 2

| | | Acrylic triblock copolymer | | | | | | Comparative polymer | | |
|---|---|---|---|---|---|---|---|---|---|---|
| | | C-1 | C-2 | C-3 | C-4 | C-5 | C-6 | C-7 | C-8 | C-9 |
| Structure | | PMMA-PnBA-PMMA triblock | PMMA-PnBA-PMMA triblock | PMMA-PnBA-PMMA triblock | PMMA-PnBA-PMMA triblock | PMMA-PnBA-PMMA triblock | PMMA-PnBA-PMMA triblock | PMMA-PnBA diblock | PMMA homopolymer | Pst-EEP-PSt triblock |
| Composition ratios (% by weight) | PMMA | 32 | 24 | 70 | 80 | 10 | 20 | 50 | 100 | |
| | PnBA | 68 | 76 | 30 | 20 | 90 | 80 | 50 | | |
| | PSt | | | | | | | | | 30 |
| | EEP | | | | | | | | | 70 |
| Molecular weights | Mw | 60,300 | 79,800 | 40,300 | 36,100 | 90,400 | 80,600 | 20,000 | 3,600,000 | 101,000 |

Glycidyl Group-Containing Polyethylene Copolymer D-1

A glycidyl group-containing polyethylene copolymer D-1 is "AX8900" manufactured by ARKEMA, and is a glycidyl methacrylate/ethylene/methyl acrylate copolymer. A composition ratio of glycidyl methacrylate/ethylene/methyl acrylate is 8/68/24 (% by weight). A glass transition temperature (Tg) of the glycidyl group-containing polyethylene copolymer D-1 is −33° C.

Glycidyl Group-Containing Polyethylene Copolymer D-2

A glycidyl group-containing polyethylene copolymer D-2 is "Bondfast 7L" manufactured by Sumitomo Chemical Co., Ltd., and is a glycidyl methacrylate/ethylene/methyl acrylate copolymer. A composition ratio of glycidyl methacrylate/ethylene/methyl acrylate is 3/70/27 (% (by weight) A glass transition temperature (Tg) of the glycidyl group-containing polyethylene copolymer D-2 is −33° C.

Glycidyl Group-Containing Polyethylene Copolymer D-3

A glycidyl group-containing polyethylene copolymer D-3 is "CG5001" manufactured by Sumitomo Chemical Co., Ltd., and is a glycidyl methacrylate/ethylene copolymer. The composition ratio of glycidyl methacrylate/ethylene is 19/81 (% by weight). A glass transition temperature (Tg) of the glycidyl methacrylate/ethylene copolymer is −38° C.

Glycidyl Group-Containing Polyethylene Copolymer D-4

A glycidyl group-containing polyethylene copolymer D-4 is "MODIPER A4300" manufactured by NOF Corporation, and is a copolymer obtained by performing graft polymerization of butyl acrylate and methyl methacrylate as a vinyl monomer, onto a main chain of the glycidyl methacrylate/ethylene copolymer. The composition ratio of glycidyl methacrylate/ethylene/butyl acrylate/methyl methacrylate is 9/61/21/9 (% by weight). A glass transition temperature (Tg) of the glycidyl methacrylate/ethylene copolymer is −45° C.

Glycidyl Group-Containing Polyethylene Copolymer D-5

25 parts by weight of glycidyl methacrylate, and 0.5 parts by weight of dialkylperoxide (Product name: Perhexa 25B manufactured by NOF Corporation) are evenly mixed to 75 parts by weight of polyethylene (Product name: Niporon-Z 1P53A manufactured by Tosoh Corporation) in Henschel mixer. Thereafter, the resultant is extruded at a cylinder temperature of 220° C. with a twin screw extruder (Product name: TEM-35 manufactured by Toshiba Machine Co., Ltd.) to obtain an ethylene/glycidyl methacrylate copolymer (composition ratio of ethylene/glycidyl methacrylate=75/25 (% by weight)). A glass transition temperature (Tg) of the ethylene/glycidyl methacrylate copolymer is −32° C. This is a glycidyl group-containing polyethylene copolymer D-5.

Glycidyl Group-Containing Polyethylene Copolymer D-6

20 parts by weight of glycidyl methacrylate, 80 parts by weight of polyethylene, and 0.5 parts by weight of dialkylperoxide are extruded in the same condition as the copolymer D-5, to obtain an ethylene/glycidyl methacrylate copolymer (composition ratio of ethylene/glycidyl methacrylate=80/20 (% by weight)). A glass transition temperature (Tg) of the ethylene/glycidyl methacrylate copolymer is −36° C. This is a glycidyl group-containing polyethylene copolymer D-6.

Glycidyl Group-Containing Polyethylene Copolymer D-7

2 parts by weight of glycidyl methacrylate, 98 parts by weight of polyethylene, and 0.5 parts by weight of dialkylperoxide are extruded in the same manner as the copolymer D-5, to obtain an ethylene/glycidyl methacrylate copolymer (composition ratio of ethylene/glycidyl methacrylate=98/2 (% by weight)). A glass transition temperature (Tg) of the ethylene/glycidyl methacrylate copolymer is −57° C. This is a glycidyl group-containing polyethylene copolymer D-7.

Glycidyl Group-Containing Polyethylene Copolymer D-8

1 parts by weight of glycidyl methacrylate, 99 parts by weight of polyethylene, and 0.5 parts by weight of dialkylperoxide are extruded in the same manner as the copolymer D-5, to obtain an ethylene/glycidyl methacrylate copolymer (composition ratio of ethylene/glycidyl methacrylate=99/1 (% by weight)). A glass transition temperature (Tg) of the ethylene/glycidyl methacrylate copolymer is −58° C. This is a glycidyl group-containing polyethylene copolymer D-8.

Comparative Polymer D-9

A comparative polymer D-9 is "VC40" manufactured by Sumitomo Chemical Co., Ltd., which is an ethylene homopolymer. A glass transition temperature (Tg) of the ethylene homopolymer is −58° C.

Comparative Polymer D-10

A comparative polymer D-10 is "Modiper A5300" manufactured by NOF Corporation, which is a copolymer obtained by performing graft polymerization of butyl acrylate and methyl methacrylate as vinyl monomer onto a main chain of the ethylene/ethyl acrylate copolymer. The composition ratio of ethylene/ethyl acrylate/butyl acrylate/methyl methacrylate is 56/14/21/9 (% by weight). The glass transition temperature (Tg) of the ethylene/ethyl acrylate copolymer is −51° C.

Comparative Polymer D-11

62 parts by weight of ethylene, 38 parts by weight of methyl methacrylate are mixed, to obtain ethylene/methyl methacrylate copolymer (composition ratio-62/38 (% by weight)). A glass transition temperature (Tg) of the ethylene/methyl methacrylate copolymer is 4° C. This is a comparative polymer D-11.

Comparative Polymer D-12

2 parts by weight of glycidyl methacrylate, 26 parts by weight of acrylonitrile, and 72 parts by weight of styrene are mixed to obtain a glycidyl methacrylate/acrylonitrile/styrene copolymer (composition ratio=2/26/72 (% by weight)). A glass transition temperature (Tg) of the glycidyl methacrylate/acrylonitrile/styrene copolymer is 100° C. This is a comparative polymer D-12.

Compositions of the glycidyl group-containing polyethylene copolymers D-1 to D-8 and the comparative polymers D-9 and D-12 are collectively presented in Table 3.

TABLE 3

|  |  |  | Glycidyl group-containing polyethylene copolymer | | | | | | | | Comparative polymer | | | |
|---|---|---|---|---|---|---|---|---|---|---|---|---|---|---|
|  |  |  | D-1 | D-2 | D-3 | D-4 | D-5 | D-6 | D-7 | D-8 | D-9 | D-10 | D-11 | D-12 |
| Constituent component of main chain | Glycidyl group-containing (meth)acrylic acid ester unit | Glycidyl (meth)acrylate | 8 | 3 | 19 | 9 | 25 | 20 | 2 | 1 |  |  |  | 2 |
|  | Others | Ethylene | 68 | 70 | 81 | 61 | 75 | 80 | 98 | 99 | 100 | 56 | 62 |  |
|  |  | Methyl methacrylate |  |  |  |  |  |  |  |  |  |  | 38 |  |
|  |  | Methyl acrylate | 24 | 27 |  |  |  |  |  |  |  |  |  |  |
|  |  | Ethyl acrylate |  |  |  |  |  |  |  |  |  | 14 |  |  |
|  |  | Acrylonitrile |  |  |  |  |  |  |  |  |  |  |  | 26 |
|  |  | Styrene |  |  |  |  |  |  |  |  |  |  |  | 72 |
| Constituent component of side chain |  | Butyl acrylate |  |  |  | 21 |  |  |  |  |  | 21 |  |  |
|  |  | Methyl methacrylate |  |  |  | 9 |  |  |  |  |  | 9 |  |  |
|  |  | Acrylonitrile |  |  |  |  |  |  |  |  |  |  |  |  |
|  |  | Styrene |  |  |  |  |  |  |  |  |  |  |  |  |

TABLE 3-continued

|  | Glycidyl group-containing polyethylene copolymer | | | | | | | | Comparative polymer | | | |
| --- | --- | --- | --- | --- | --- | --- | --- | --- | --- | --- | --- | --- |
|  | D-1 | D-2 | D-3 | D-4 | D-5 | D-6 | D-7 | D-8 | D-9 | D-10 | D-11 | D-12 |
| Tg (° C.) of main chain | −33 | −33 | −38 | −45 | −32 | −36 | −57 | −58 | −58 | −51 | 4 | 100 |

Example 1

In the compositions presented in Table 4 (all are presented with "part by weight"), 70 parts by weight of the PC resin A-3, 30 parts by weight of the PET resin B-1, 4 parts by weight of the acrylic triblock copolymer C-1, 2 parts by weight of the glycidyl group-containing polyethylene copolymer D-1, 15 parts by weight of the aromatic condensed phosphate ester flame retardant (Product name: "CR-741", phosphorus: 9%, manufactured by Daihachi Chemical Industry Co., Ltd.), 1 part by weight of the flame retardant antidrip agent (Product name "A-3800", content of polytetrafluoroethylene: 50%, manufactured by Mitsubishi Rayon Co., Ltd.), and 0.2 parts by weight of the antioxidant (phenol antioxidant, Product name: "Irganox1076" manufactured by BASF SE) are mixed in a tumbler, and are melted, kneaded, and extruded with a vented twin screw extruder (TEX-30α manufactured by The Japan Steel Works, LTD.), in a cylinder temperature and a dice temperature which are 260° C., the number of screw rotation of 240 rpm, a degree of ventilation suction of 100 MPa, and a discharging amount of 10 kg/h. Also, the discharged resin from the twin screw extruder is cut into a pellet shape, to obtain pellets.

The obtained pellet-shaped resin composition is dried with a hot air dryer at 90° C. for 4 hours, and injection-molded with an injection molding machine (Product name: "NEX500" manufactured by Toshiba Machine Co., Ltd.) at a cylinder temperature of 260° C. and a mold temperature of 60° C., to obtain a predetermined resin molded article (test sample for evaluation).

Example 2

A predetermined resin molded article (test sample for evaluation) is obtained in the same condition as Example 1 except for using the acrylic block copolymer C-2 instead of the acrylic block copolymer C-1.

Example 3

A predetermined resin molded article (test sample for evaluation) is obtained in the same condition as Example 1 except for using the acrylic block copolymer C-3 instead of the acrylic block copolymer C-1.

Example 4

A predetermined resin molded article (test sample for evaluation) is obtained in the same condition as Example 1 except for using the acrylic block copolymer C-4 instead of the acrylic block copolymer C-1.

Example 5

A predetermined resin molded article (test sample for evaluation) is obtained in the same condition as Example 1 except for using the acrylic block copolymer C-5 instead of the acrylic block copolymer C-1.

Example 6

A predetermined resin molded article (test sample for evaluation) is obtained in the same condition as Example 1 except for using the acrylic block copolymer C-6 instead of the acrylic block copolymer C-1.

Example 7

A predetermined resin molded article (test sample for evaluation) is obtained in the same condition as Example 1 except for changing the content of the acrylic block copolymer C-1 from 4 parts by weight to 2 parts by weight.

Example 8

A predetermined resin molded article (test sample for evaluation) is obtained in the same condition as Example 1 except for changing the content of the acrylic block copolymer C-1 from 4 parts by weight to 10 parts by weight.

Example 9

A predetermined resin molded article (test sample for evaluation) is obtained in the same condition as Example 1 except for changing the content of the acrylic block copolymer C-1 from 4 parts by weight to 1 part by weight.

Example 10

A predetermined resin molded article (test sample for evaluation) is obtained in the same condition as Example 1 except for changing the content of the acrylic block copolymer C-1 from 4 parts by weight to 11 parts by weight.

Comparative Example 1

A predetermined resin molded article (test sample for evaluation) is obtained in the same condition as Example 1 except for using the comparative polymer C-7 instead of the acrylic block copolymer C-1.

Comparative Example 2

A predetermined resin molded article (test sample for evaluation) is obtained in the same condition as Example 1 except for using the comparative polymer C-8 instead of the acrylic block copolymer C-1.

Comparative Example 3

A predetermined resin molded article (test sample for evaluation) is obtained in the same condition as Example 1 except for using the comparative polymer C-9 instead of the acrylic block copolymer C-1.

Comparative Example 4

A predetermined resin molded article (test sample for evaluation) is obtained in the same condition as Example 1 except for not adding the glycidyl group-containing polyethylene copolymer D-1.

Comparative Example 5

A predetermined resin molded article (test sample for evaluation) is obtained in the same condition as in Example 1 except for not adding the acrylic block copolymer C-1.

Comparative Example 6

A predetermined resin molded article (test sample for evaluation) is obtained in the same condition as in Example 1 except for not adding the acrylic block copolymer C-1, and using the comparative polymer D-12 instead of the glycidyl group-containing polyethylene copolymer D-1.

Comparative Example 7

A predetermined resin molded article (test sample for evaluation) is obtained in the same condition as Example 1 except for not adding the acrylic block copolymer C-1, using the comparative polymer D-12 instead of the glycidyl group-containing polyethylene copolymer D-1, and adding 4 parts by weight of a toughener(methyl methacrylate/butadiene/styrene copolymer (MBS resin), Product name: "EM-500" manufactured by LG Chem).

Comparative Example 8

A predetermined resin molded article (test sample for evaluation) is obtained in the same condition as Example 1 except for not adding the acrylic block copolymer C-1 and the glycidyl group-containing polyethylene copolymer D-1.

Estimations and Tests

Following estimations and tests are performed by using the obtained test samples for evaluation. Compositions of the resin compositions of Examples 1 to 10 (all presented with "part by weight") and results of the following tests are collectively presented in Table 4. In addition, compositions of the resin compositions in Comparative Examples 1 to 8 (all presented with "part by weight") and the results of the following tests are collectively presented in Table 5.

Test of Flame Retardance

UL-V tests are conducted using UL test samples for V test in UL-94 in conformity with a method regulated in UL-94, to measure a degree of flame retardance of the test sample. Here, degrees of the flame retardance in the UL-94 regulation are V-2, V-1, V-0, 5VB, and 5VA in an ascending order of the flame retardance.

Test Method of V-2, V-1, and V-0

Common to the three types above, fire of a gas burner is ignited on the lower sides of vertically maintained test samples (thickness of 0.8 mm) for 10 seconds. If the burning is stopped in 30 seconds, fire is further ignited 10 seconds. In addition, determination criteria conform to the flammability UL-94 standard.

Test Method of 5VB

An operation of igniting fire of a gas burner on the lower sides of a vertically maintained test sample (or on the center of the lower surface of the horizontally maintained test sample) (thickness of 1.5 mm) for 5 seconds, and then separating the fire for 5 second is repeated for 5 times. In addition, determination criteria conform to the flammability UL-94 standard.

Spiral Flow Length (Estimation of Molding Fluidity)

In order to estimate molding fluidity, spiral flow lengths are measured in the following method. Tests are conducted by using the above-obtained resin compositions of examples and comparative examples. Specifically, an injection molding machine (Product name: "NEX500" manufactured by Toshiba Machine Co., Ltd.) is used, a cylinder temperature is 230° C., a mold temperature is 80° C., and an injection pressure is 120 MPa. In addition, the thickness of a molded product is 2 mm, and a width is 15 mm. As a value is greater, molding fluidity is better.

Test of Heat Resistance

In a state of applying a load (1.8 MPa) determined in a test method standard of ASTM D648 to a test sample, a temperature of the test sample for evaluation is increased, a temperature in which a size of deflection becomes a specific value (deflection temperature under load: DTUL) is measured. This is estimated as a heat resistant temperature.

Test of Tensile Strength and Tensile Elongation at Break

The tensile strength and the tensile elongation at break of the test sample are measured in conformity with JIS K-7113. Further, as a molded member, a test sample (thickness of 4 mm) of JIS1 obtained by injection molding is used. As a value of the tensile strength is greater, the tensile strength is better. As a value of the tensile elongation at break is greater, the tensile elongation at break is better.

Test of Impact Resistance

Charpy impact resistance strength (Unit: $kJ/m^2$) is measured by using a product obtained by performing notch process on an ISO multipurpose dumbbell test sample, in conformity with ISO-179, with a digital impact tester (DG-5 manufactured by Toyo Seiki Seisaku-Sho Ltd.) in the MD direction, in the condition in which a rising angle is 150°, an energy of the used hammer is 2.0 J, a number of measurement is n=10. As the value of the Charpy impact resistance strength is greater, the impact resistance is better.

TABLE 4

| | Composition | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Resin composition | PC resin A-3 | 70 | 70 | 70 | 70 | 70 | 70 | 70 | 70 | 70 | 70 |
| | PET resin B-1 | 30 | 30 | 30 | 30 | 30 | 30 | 30 | 30 | 30 | 30 |
| | Acrylic triblock copolymer C-1 | 4 | | | | | | 2 | 10 | 1 | 11 |
| | Acrylic triblock copolymer C-2 | | 4 | | | | | | | | |
| | Acrylic triblock copolymer C-3 | | | 4 | | | | | | | |
| | Acrylic triblock | | | | 4 | | | | | | |

TABLE 4-continued

| | Composition | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | copolymer C-4 | | | | | | | | | | |
| | Acrylic triblock copolymer C-5 | | | | | 4 | | | | | |
| | Acrylic triblock copolymer C-6 | | | | | | 4 | | | | |
| | Glycidyl group-containing polyethylene copolymer D-1 | 2 | 2 | 2 | 2 | 2 | 2 | 2 | 2 | 2 | 2 |
| | Aromatic condensed phosphate ester flame retardant | 15 | 15 | 15 | 15 | 15 | 15 | 15 | 15 | 15 | 15 |
| | Flame retardant antidrip agent | 1.0 | 1.0 | 1.0 | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 | 0.2 | 0.2 | 0.2 |
| Evaluation result | | | | | | | | | | | |
| Flame retardance | UL-94 flame retardance (thickness: 0.8 mm) | V-0 | V-0 | V-0 | V-0 | V-0 | V-0 | V-0 | V-1 | V-0 | V-1 |
| | UL-94 flame retardance (thickness: 1.5 mm) | 5VB | 5VB | 5VB | 5VB | 5VB | 5VB | 5VB | 5VB | 5VB | 5VB |
| Fluidity | Spiral flow length (mm) | 380 | 420 | 321 | 295 | 375 | 410 | 305 | 460 | 285 | 460 |
| Heat resistance | DTUL(1.8 MPa) | 74.7 | 73.8 | 74.8 | 72.8 | 71.0 | 72.5 | 73.0 | 70.2 | 72.0 | 70.0 |
| Mechanical Characteristics | Tensile strength (MPa) | 69 | 68 | 64 | 62 | 61 | 65 | 67 | 61 | 66 | 60 |
| | Tensile elongation at break (%) | 28 | 24 | 13 | 10 | 11 | 19 | 13 | 10 | 10 | 12 |
| | Charpy impact resistance strength (kJ/m$^2$) | 17 | 18 | 13 | 9 | 8 | 14 | 12 | 17 | 9 | 14 |

TABLE 5

| | Composition | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Resin composition | PC resin A-3 | 70 | 70 | 70 | 70 | 70 | 70 | 70 | 70 |
| | PET resin B-1 | 30 | 30 | 30 | 30 | 30 | 30 | 30 | 30 |
| | Comparative polymer C-7 | 4 | | | | | | 2 | 10 |
| | Comparative polymer C-8 | | 4 | | | | | | |
| | Comparative polymer C-9 | | | 4 | | | | | |
| | Acrylic triblock copolymer C-1 | | | | | 4 | | | |
| | Glycidyl group-containing polyethylene copolymer D-1 | 2 | 2 | 2 | | 2 | | | |
| | Comparative polymer D-12 | | | | | | | 2 | 2 |
| | Aromatic condensed phosphate ester flame retardant | 15 | 15 | 15 | 15 | 15 | 15 | 15 | 15 |
| | Flame retardant antidrip agent | 1.0 | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 | 0.2 |
| | Toughener | | | | 4 | | | | |
| Evaluation result | | | | | | | | | |
| Flame retardance | UL-94 flame retardance (thickness: 0.8 mm) | not-V | not-V | not-V | V-2 | V-0 | V-2 | not-V | not-V |
| | UL-94 flame retardance (thickness: 1.5 mm) | not-V | V-2 | V-2 | V-0 | V-1 | V-1 | V-2 | V-2 |
| Fluidity | Spiral flow length (mm) | 240 | 245 | 235 | 400 | 230 | 225 | 220 | 460 |
| Heat resistance | DTUL(1.8 MPa) | 70.2 | 72.2 | 72 | 73.3 | 73.8 | 73 | 70.8 | 68.0 |
| Mechanical Characteristics | Tensile strength (MPa) | 58 | 59 | 57 | 60 | 62 | 61 | 62 | 57 |
| | Tensile elongation at break (%) | 4 | 5 | 3 | 9 | 5 | 4 | 6 | 2 |

TABLE 5-continued

| Composition | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Charpy impact resistance strength (kJ/m$^2$) | 4 | 3 | 2 | 4 | 4 | 3 | 5 | 3 |

As presented in Tables 4 and 5, the resin molded articles of Examples 1 to 10 obtained from the resin compositions having an aromatic polycarbonate resin, an aromatic polystyrene resin, an acrylic triblock copolymer composed of a polymer block containing an acrylic acid ester unit and a polymer block containing a methacrylic acid ester unit, a glycidyl group-containing polyethylene copolymer, an organic phosphorus flame retardant, and a flame retardant antidrip agent have improved impact resistance, flame retardance, and molding fluidity, compared with the resin molded article of Comparative Example 8 obtained from the resin composition composed of the aromatic polycarbonate resin, the aromatic polystyrene resin, the organic phosphorus flame retardant, and the flame retardant antidrip agent. In addition, the resin molded articles of Examples 1 to 10 have improved impact resistance and flame retardance, compared with the resin molded articles of Comparative Examples 1 to 7 containing an acrylic copolymer, a glycidyl group-containing styrene copolymer, or a glycidyl group-containing polyethylene copolymer.

In addition, the resin molded articles of Examples 1 to 3 and 6 obtainable from the resin composition in which a content of PnBA (acrylic ester copolymer block) is from 30% by weight to 80% by weight in the acrylic block copolymer have improved impact resistance, compared with the resin molded articles of Examples 4 and 5 in which the content is less than 30% by weight or exceeds 80% by weight. In addition, the resin molded articles of Examples 1, 7, and 8 obtainable from the resin composition in which the content of the acrylic triblock copolymer is from 2% by weight to 10% by weight with respect to the 100 parts by weight of the aromatic polycarbonate resin and the aromatic polyester resin in total have improved impact resistance, compared with the resin molded articles of Examples 9 and 10 obtainable from the resin composition in which the content of the acrylic triblock copolymer is less than 2% by weight or exceeds 10% by weight.

Example 11

A predetermined resin molded article (test sample for evaluation) is obtained in the same condition as Example 1 except for using the glycidyl group-containing polyethylene copolymer D-2 instead of the glycidyl group-containing polyethylene copolymer D-1.

Example 12

A predetermined resin molded article (test sample for evaluation) is obtained in the same condition as Example 1 except for using the glycidyl group-containing polyethylene copolymer D-3 instead of the glycidyl group-containing polyethylene copolymer 0-1.

Example 13

A predetermined resin molded article (test sample for evaluation) is obtained in the same condition as Example 1 except for using the glycidyl group-containing polyethylene copolymer D-4 instead of the glycidyl group-containing polyethylene copolymer D-1.

Example 14

A predetermined resin molded article (test sample for evaluation) is obtained in the same condition as Example 1 except for using the glycidyl group-containing polyethylene copolymer D-5 instead of the glycidyl group-containing polyethylene copolymer D-1.

Example 15

A predetermined resin molded article (test sample for evaluation) is obtained in the same condition as Example 1 except for changing the content of the glycidyl group-containing polyethylene copolymer D-1 from 2 parts by weight to 1 parts by weight.

Example 16

A predetermined resin molded article (test sample for evaluation) is obtained in the same condition as Example 1 except for changing the content of the glycidyl group-containing polyethylene copolymer D-1 from 2 parts by weight to 5 parts by weight.

Example 17

A predetermined resin molded article (test sample for evaluation) is obtained in the same condition as Example 1 except for changing the content of the glycidyl group-containing polyethylene copolymer D-1 from 2 parts by weight to 0.5 parts by weight.

Example 18

A predetermined resin molded article (test sample for evaluation) is obtained in the same condition as Example 1 except for changing the content of the glycidyl group-containing polyethylene copolymer D-1 from 2 parts by weight to 6 parts by weight.

Example 19

A predetermined resin molded article (test sample for evaluation) is obtained in the same condition as Example 1 except for using the glycidyl group-containing polyethylene copolymer D-6 instead of the glycidyl group-containing polyethylene copolymer D-1.

Example 20

A predetermined resin molded article (test sample for evaluation) is obtained in the same condition as Example 1 except for using the glycidyl group-containing polyethylene copolymer D-7 instead of the glycidyl group-containing polyethylene copolymer D-1.

Example 21

A predetermined resin molded article (test sample for evaluation) is obtained in the same condition as Example 1 except for using the glycidyl group-containing polyethylene copolymer D-8 instead of the glycidyl group-containing polyethylene copolymer D-1.

Comparative Example 9

A predetermined resin molded article (test sample for evaluation) is obtained in the same condition as Example 1 except for using the comparative polymer D-9 instead of the glycidyl group-containing polyethylene copolymer D-1.

Comparative Example 10

A predetermined resin molded article (test sample for evaluation) is obtained in the same condition as Example 1 except for using the comparative polymer D-10 instead of the glycidyl group-containing polyethylene copolymer D-1.

Comparative Example 11

A predetermined resin molded article (test sample for evaluation) is obtained in the same condition as Example 1 except for using the comparative polymer D-11 instead of the glycidyl group-containing polyethylene copolymer D-1.

Estimations and tests are performed in the same manner as Example 1 by using the obtained test samples for evaluation. Compositions of the resin compositions of Examples 11 to 21 (all presented with "part by weight") and the results of the above tests are collectively presented in Table 6. In addition, compositions of the resin compositions of Comparative Examples 9 to 11 (all presented with "part by weight") and the results of the above tests are collectively presented in Table 7.

TABLE 6

| | Composition | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Resin composition | PC resin A-3 | 70 | 70 | 70 | 70 | 70 | 70 | 70 | 70 | 70 | 70 | 70 |
| | PET resin B-1 | 30 | 30 | 30 | 30 | 30 | 30 | 30 | 30 | 30 | 30 | 30 |
| | Acrylic triblock copolymer C-1 | 4 | 4 | 4 | 4 | 4 | 4 | 4 | 4 | 4 | 4 | 4 |
| | Glycidyl group-containing polyethylene copolymer D-1 | | | | | 1 | 5 | 0.5 | 6 | | | |
| | Glycidyl group-containing polyethylene copolymer D-2 | 2 | | | | | | | | | | |
| | Glycidyl group-containing polyethylene copolymer D-3 | | 2 | | | | | | | | | |
| | Glycidyl group-containing polyethylene copolymer D-4 | | | 2 | | | | | | | | |
| | Glycidyl group-containing polyethylene copolymer D-5 | | | | 2 | | | | | | | |
| | Glycidyl group-containing polyethylene copolymer D-6 | | | | | | | | | 2 | | |
| | Glycidyl group-containing polyethylene copolymer D-7 | | | | | | | | | | 2 | |
| | Glycidyl group-containing polyethylene copolymer D-8 | | | | | | | | | | | 2 |
| | Aromatic condensed phosphate ester flame retardant | 15 | 15 | 15 | 15 | 15 | 15 | 15 | 15 | 15 | 15 | 15 |
| | Flame retardant antidrip agent | 1.0 | 1.0 | 1.0 | 1.0 | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 | 0.2 | 0.2 | 0.2 | 0.2 |
| Evaluation result | | | | | | | | | | | | |
| Flame retardance | UL-94 flame retardance (thickness: 0.8 mm) | V-0 | V-0 | V-0 | V-0 | V-1 | V-0 | V-1 | V-0 | V-0 | V-1 | V-1 |
| | UL-94 flame retardance (thickness: 1.5 mm) | 5VB | 5VB | 5VB | 5VB | 5VB | 5VB | 5VB | 5VB | 5VB | 5VB | 5VB |
| Fluidity | Spiral flow length (mm) | 385 | 305 | 380 | 280 | 375 | 292 | 375 | 285 | 275 | 395 | 390 |
| Heat resistance | DTUL (1.8 MPa) | 74 | 73.9 | 74.1 | 72 | 73.0 | 73.0 | 72.0 | 72.5 | 71.5 | 72.3 | 72.0 |
| Mechanical Characteristics | Tensile strength (MPa) | 68 | 66 | 60 | 57 | 67 | 70 | 66 | 69 | 63 | 66 | 65 |
| | Tensile elongation at break (%) | 22 | 12 | 14 | 10 | 14 | 11 | 9 | 10 | 10 | 10 | 9 |
| | Charpy impact resistance strength (kJ/m$^2$) | 14 | 12 | 11 | 9 | 9 | 15 | 8 | 13 | 10 | 8 | 8 |

TABLE 7

| | Composition | Comparative Example 9 | Comparative Example 10 | Comparative Example 11 |
|---|---|---|---|---|
| Resin composition | PC resin A-3 | 70 | 70 | 70 |
| | PET resin B-1 | 30 | 30 | 30 |
| | Acrylic triblock copolymer C-1 | 4 | 4 | 4 |
| | Comparative polymer | 2 | | |

TABLE 7-continued

|  | Composition | Comparative Example 9 | Comparative Example 10 | Comparative Example 11 |
|---|---|---|---|---|
|  | D-9 Comparative polymer |  | 2 |  |
|  | D-10 Comparative polymer |  |  | 2 |
|  | D-11 Aromatic condensed phosphate ester flame retardant | 15 | 15 | 15 |
|  | Flame retardant antidrip agent | 1.0 | 1.0 | 1.0 |
|  | Antioxidant | 0.2 | 0.2 | 0.2 |
| Evaluation result |  |  |  |  |
| Flame retardance | UL-94 flame retardance (thickness: 0.8 mm) | not-V | not-V | not-V |
|  | UL-94 flame retardance (thickness: 1.5 mm) | not-V | not-V | not-V |
| Fluidity | Spiral flow length (mm) | 240 | 245 | 285 |
| Heat resistance | DTUL (1.8 MPa) | 70.0 | 71.2 | 71.5 |
| Mechanical Characteristics | Tensile strength (MPa) | 55 | 56 | 58 |
|  | Tensile elongation at break (%) | 5 | 4 | 5 |
|  | Charpy impact resistance strength (kJ/m$^2$) | 2 | 3 | 3 |

As presented in Tables 6 and 7, the resin molded articles of Examples 11 to 21 using the glycidyl group-containing polyethylene copolymer have improved impact resistance and flame retardance, compared with the resin molded articles of Comparative Examples 9 to 11 using the ethylene copolymer that does not contain a glycidyl group instead of the glycidyl group-containing polyethylene copolymer. In addition, the resin molded articles of Examples 1, 15, and 16 obtainable from the resin compositions in which the content of the glycidyl group-containing polyethylene copolymer is from 1% by weight to 5% by weight with respect to 100 parts by weight of the aromatic polycarbonate resin and the aromatic polyester resin have improved impact resistance, compared with the resin molded articles of Examples 17 and 18 obtainable from the resin compositions in which the content of the glycidyl group-containing polyethylene copolymer is less than 1% by weight or exceeds 5% by weight.

Among the resin molded articles of Examples 11 to 21, the resin molded articles of Examples 19 and 20 in which the content of the glycidyl group-containing (meth)acrylic acid ester unit in the glycidyl group-containing polyethylene copolymer is from 2% by weight to 20% by weight and the glass transition temperature is 0° C. or less and the resin molded article of Example 13 using the copolymer obtained by performing graft polymerization of a vinyl monomer onto a main chain of a polyethylene copolymer have improved impact resistance, compared with the resin molded articles of Examples 14 and 21 in which the content of the glycidyl group-containing (meth)acrylic ester monomer unit is less than 2% by weight or exceeds 20% by weight (glass transition temperature is 0° C. or less).

Example 22

A predetermined resin molded article (test sample for evaluation) is obtained in the same condition as Example 1 except for using the PC resin A-1 instead of the PC resin A-3.

Example 23

A predetermined resin molded article (test sample for evaluation) is obtained in the same condition as Example 1 except for using the PC resin A-2 instead of the PC resin A-3.

Example 24

A predetermined resin molded article (test sample for evaluation) is obtained in the same condition as Example 1 except for adding 35 parts by weight of the PC resin A-1, and 35 parts by weight of the PC resin A-3, instead of adding 70 parts by weight of the PC resin A-3.

Example 25

A predetermined resin molded article (test sample for evaluation) is obtained in the same condition as Example 1 except for adding 35 parts by weight of the PC resin A-2 and 35 parts by weight of the PC resin A-3, instead of adding 70 parts by weight of the PC resin A-3.

Example 26

A predetermined resin molded article (test sample for evaluation) is obtained in the same condition as Example 1 except for changing the content of the PC resin A-3 from 70 parts by weight to 50 parts by weight and the content of the PET resin B-1 from 30 parts by weight to 50 parts by weight.

Example 27

A predetermined resin molded article (test sample for evaluation) is obtained in the same condition as Example 1 except for changing the content of the PC resin A-3 from 70 parts by weight to 90 parts by weight, and the content of the PET resin B-1 from 30 parts by weight to 10 parts by weight.

Example 28

A predetermined resin molded article (test sample for evaluation) is obtained in the same condition as Example 1 except for adding 35 parts by weight of the PC resin A-4 and 35 parts by weight of the PC resin A-5, instead of adding 70 parts by weight of the PC resin A-3.

Example 29

A predetermined resin molded article (test sample for evaluation) is obtained in the same condition as Example 1 except for adding 70 parts by weight of the PC resin A-5, instead of adding 70 parts by weight of the PC resin A-3.

Example 30

A predetermined resin molded article (test sample for evaluation) is obtained in the same condition as Example 1 except for adding 70 parts by weight of the PC resin A-6, instead of adding 70 parts by weight of the PC resin A-3.

Example 31

A predetermined resin molded article (test sample for evaluation) is obtained in the same condition as Example 1 except for adding 30 parts by weight of the PET resin B-2 instead of adding 30 parts by weight of the PET resin B-1.

Example 32

A predetermined resin molded article (test sample for evaluation) is obtained in the same condition as Example 1 except for adding 30 parts by weight of the PET resin B-3 instead of adding 30 parts by weight of the PET resin B-1.

Example 33

A predetermined resin molded article (test sample for evaluation) is obtained in the same condition as Example 1 except for adding 70 parts by weight of the PC resin A-5 instead of 70 parts by weight of the PC resin A-3, and adding 30 parts by weight of the PET resin B-3 instead of 30 parts by weight of the PET resin B-1.

Example 34

A predetermined resin molded article (test sample for evaluation) is obtained in the same condition as Example 1 except for adding 30 parts by weight of a PBT resin (Product name: "5020" manufactured by Mitsubishi Engineering-Plastics Corporation) instead of 30 parts by weight of the PET resin B-1.

Compositions of the resin compositions of Examples 22 to 27 (all presented with "part by weight") and the results of the above tests are collectively presented in Table 8. In addition, compositions of the resin compositions of Examples 28 to 34 (all presented with "part by weight") and the results of the above tests are collectively presented in Table 9.

TABLE 8

| | Composition | Example 22 | Example 23 | Example 24 | Example 25 | Example 26 | Example 27 |
|---|---|---|---|---|---|---|---|
| Resin Composition | PC resin A-1 | 70 | | 35 | | | |
| | PC resin A-2 | | 70 | | 35 | | |
| | PC resin A-3 | | | 35 | 35 | 50 | 90 |
| | PET resin B-1 | 30 | 30 | 30 | 30 | 50 | 10 |
| | Acrylic triblock copolymer C-1 | 4 | 4 | 4 | 4 | 4 | 4 |
| | Glycidyl group-containing polyethylene copolymer D-1 | 2 | 2 | 2 | 2 | 2 | 2 |
| | Aromatic condensed phosphate ester flame retardant | 15 | 15 | 15 | 15 | 15 | 15 |
| | Flame retardant antidrip agent | 1.0 | 1.0 | 1.0 | 1.0 | 1.0 | 1.0 |
| | Antioxidant | 0.2 | 0.2 | 0.2 | 0.2 | 0.2 | 0.2 |
| Evaluation result | | | | | | | |
| Flame retardance | UL-94 flame retardance (thickness: 0.8 mm) | V-2 | V-2 | V-0 | V-0 | V-2 | V-0 |
| | UL-94 flame retardance (thickness: 1.5 mm) | V-1 | V-1 | 5VB | 5VB | V-1 | 5VB |
| Fluidity | Spiral flow length (mm) | 480 | 450 | 425 | 412 | 480 | 260 |
| Heat resistance | DTUL (1.8 MPa) | 73.5 | 72.5 | 74.2 | 74.5 | 70.5 | 78 |
| Mechanical Characteristics | Tensile strength (MPa) | 68 | 69 | 69 | 69 | 62 | 72 |
| | Tensile elongation at break (%) | 15 | 20 | 26 | 25 | 10 | 29 |
| | Charpy impact resistance strength (kJ/m$^2$) | 9 | 11 | 14 | 15 | 8 | 26 |

TABLE 9

| | Composition | Example 28 | Example 29 | Example 30 | Example 31 | Example 32 | Example 33 | Example 34 |
|---|---|---|---|---|---|---|---|---|
| Resin Composition | PC resin A-3 | | | | 70 | 70 | | 70 |
| | PC resin A-4 | 35 | | | | | | |
| | PC resin A-5 | 35 | 70 | | | | 70 | |
| | PC resin A-6 | | | 70 | | | | |
| | PET resin B-1 | 30 | 30 | 30 | | | | |
| | PET resin B-2 | | | | 30 | | | |
| | PET resin B-3 | | | | | 30 | 30 | |
| | PET resin | | | | | | | 30 |
| | Acrylic triblock copolymer C-1 | | | | | | | 4 |
| | Acrylic triblock copolymer C-2 | 4 | | | | | | |
| | Acrylic triblock copolymer C-3 | | 4 | | | | | |
| | Acrylic triblock copolymer C-4 | | | 4 | | | | |
| | Acrylic triblock copolymer C-5 | | | | 4 | 4 | 4 | |
| | Glycidyl group-containing polyethylene copolymer D-1 | 2 | 2 | 2 | 2 | 2 | 2 | 2 |
| | Aromatic condensed phosphate ester flame retardant | 15 | 15 | 15 | 15 | 15 | 15 | 15 |
| | Flame retardant antidrip agent | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 |

TABLE 9-continued

| Composition | | Example 28 | Example 29 | Example 30 | Example 31 | Example 32 | Example 33 | Example 34 |
|---|---|---|---|---|---|---|---|---|
| Evaluation result | | | | | | | | |
| Flame retardance | UL-94 flame retardance (thickness: 0.8 mm) | V-0 | V-0 | V-0 | V-0 | V-0 | V-0 | V-0 |
| | UL-94 flame retardance (thickness: 1.5 mm) | 5VB | 5VB | V-0 | 5VB | 5VB | 5VB | 5VB |
| Fluidity | Spiral flow length (mm) | 440 | 410 | 425 | 410 | 422 | 435 | 330 |
| Heat resistance | DTUL (1.8 MPa) | 75.5 | 75.5 | 74.8 | 75.4 | 75.9 | 74.7 | 77.0 |
| Mechanical Characteristics | Tensile strength (MPa) | 70 | 71 | 69 | 70 | 69 | 69 | 72 |
| | Tensile elongation at break (%) | 32 | 35 | 32 | 36 | 34 | 42 | 40 |
| | Charpy impact resistance strength (kJ/m$^2$) | 20 | 24 | 22 | 23 | 25 | 28 | 30 |

As presented in Tables 8 and 9, among the resin molded articles of Examples 22 to 34, the resin molded articles of Examples 28 to 33 using the recycled PC resin or the recycled PET resin have improved impact resistance, compared with the resin molded articles of Examples 22 to 27 not using the recycled PC resin and the recycled PET resin.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   an aromatic polycarbonate resin;
   an aromatic polyester resin;
   1% by weight to 11% by weight of an acrylic triblock copolymer with respect to 100 parts by weight of the aromatic polycarbonate resin and the aromatic polyester resin total, the acrylic triblock copolymer being composed of a polymer block containing an n-butyl acrylate unit and a polymer block containing a methyl methacrylate unit;
   wherein the content of the polymer block containing n-butyl acrylate in the acrylic triblock copolymer is from 30% by weight to 40 wt % by weight of the acrylic triblock copolymer;
   0.5% by weight to 6% by weight of a glycidyl group-containing polyethylene copolymer with respect to 100 parts by weight of the aromatic polycarbonate resin and the aromatic polyester resin in total, the glycidyl group-containing polyethylene copolymer being composed of a glycidyl group-containing (meth)acrylic acid ester unit and an ethylene unit, and in which a content of the glycidyl group-containing (meth)acrylic acid ester unit in the glycidyl group-containing polyethylene copolymer is from 1% by weight to 25% by weight and the glass transition temperature is from −32° C. to −0.58° C.;
   an organic phosphorus flame retardant; and
   a flame retardant antidrip agent.

2. The resin composition according to claim 1, wherein the resin composition comprises from 2% by weight to 10% by weight of the acrylic triblock copolymer with respect to 100 parts by weight of the aromatic polycarbonate resin and the aromatic polyester resin in total.

3. The resin composition according to claim 1, wherein the composition comprises from 1% by weight to 5% by weight of the glycidyl group-containing polyethylene copolymer with respect to 100 parts by weight of the aromatic polycarbonate resin and the aromatic polyester resin in total.

4. The resin composition according to claim 2, wherein the composition comprises from 1% by weight to 5% by weight of the glycidyl group-containing polyethylene copolymer with respect to 100 parts by weight of the aromatic polycarbonate resin and the aromatic polyester resin in total.

5. The resin composition according to claim 1, wherein the content of the glycidyl group-containing (meth)acrylic acid ester unit in the glycidyl group-containing polyethylene copolymer is from 2% by weight to 20% by weight.

6. The resin composition according to claim 2, wherein the content of the glycidyl group-containing (meth)acrylic acid ester unit in the glycidyl group-containing polyethylene copolymer is from 2% by weight to 20% by weight.

7. The resin composition according to claim 3, wherein the content of the glycidyl group-containing (meth)acrylic acid ester unit in the glycidyl group-containing polyethylene copolymer is from 2% by weight to 20% by weight.

8. The resin composition according to claim 4, wherein the content of the glycidyl group-containing (meth)acrylic acid ester unit in the glycidyl group-containing polyethylene copolymer is from 2% by weight to 20% by weight.

9. A resin molded article containing the resin composition according to claim 1.

10. A resin molded article containing the resin composition according to claim 2.

* * * * *